United States Patent
Schmid et al.

(10) Patent No.: US 11,585,895 B2
(45) Date of Patent: Feb. 21, 2023

(54) DETECTION OF PARKING SLOT CONFIGURATION BASED ON REPETITIVE PATTERNS

(71) Applicant: VEONEER SWEDEN AB, Vargarda (SE)

(72) Inventors: Andreas Schmid, Dachau (DE); Christopher Unverdorben, Munich (DE); Christian Pfaffenzeller, Olching (DE)

(73) Assignee: Veoneer Sweden AB, Vårgårda (SE)

( * ) Notice: Subject to any disclaimer, the term of this patent is extended or adjusted under 35 U.S.C. 154(b) by 130 days.

(21) Appl. No.: 16/763,192

(22) PCT Filed: Oct. 24, 2018

(86) PCT No.: PCT/EP2018/079152
§ 371 (c)(1),
(2) Date: May 11, 2020

(87) PCT Pub. No.: WO2019/091784
PCT Pub. Date: May 16, 2019

(65) Prior Publication Data
US 2020/0393541 A1 Dec. 17, 2020

(30) Foreign Application Priority Data
Nov. 10, 2017 (EP) .................... 17201076

(51) Int. Cl.
*G01S 7/41* (2006.01)
*G01S 13/00* (2006.01)
(Continued)

(52) U.S. Cl.
CPC ............... *G01S 7/411* (2013.01); *G01S 7/414* (2013.01); *G01S 13/003* (2013.01); (Continued)

(58) Field of Classification Search
CPC ........ G01S 7/411; G01S 7/414; G01S 13/003; G01S 13/931; G01S 2013/9314;
(Continued)

(56) References Cited

U.S. PATENT DOCUMENTS 6,885,312 B1 * 4/2005 Kirkpatrick .............. G08G 1/14
340/932.2
9,013,326 B2 * 4/2015 Desiderio ................ G08G 1/14
340/932.2
(Continued)

FOREIGN PATENT DOCUMENTS

DE 102013103569 A1 10/2013
EP 2899076 A1 7/2015

OTHER PUBLICATIONS

H. G. Jung et al, "Scanning Laser Radar-Based Target Position Designation for Parking Aid System"; IEEE Transactions on Intelligent Transportation Systems; vol. 9, No. 3; Sep. 2008; pp. 406-424; published by IEEE, Piscataway, NJ, USA. (Year: 2008).*
(Continued)

*Primary Examiner* — Bernarr E Gregory
(74) *Attorney, Agent, or Firm* — Dickinson Wright PLLC

(57) ABSTRACT

A sensor signal processing unit (100) arranged to detect a configuration of parking slots (1a,1b,1c,1d) based on radar detections received from a radar-based sensor system (120). The unit includes a histogram unit arranged to generate a representation of a spatial distribution of a set of radar detection coordinates, and a detection unit arranged to detect the configuration of parking slots. The detection unit is
(Continued)

arranged to detect the configuration of parking slots based on a Fourier transform of the representation of spatial distribution.

15 Claims, 7 Drawing Sheets

(51) Int. Cl.
  *G01S 13/931* (2020.01)
  *G01S 7/00* (2006.01)
(52) U.S. Cl.
  CPC ..... *G01S 13/931* (2013.01); *G01S 2013/9314* (2013.01); *G01S 2013/93271* (2020.01); *G01S 2013/93274* (2020.01)
(58) Field of Classification Search
  CPC ............ G01S 2013/93271; G01S 2013/93274; G08G 1/14
  See application file for complete search history.

(56) References Cited

U.S. PATENT DOCUMENTS

| | | | |
|---|---|---|---|
| 9,389,313 | B2 | 7/2016 | Hiramaki et al. |
| 9,418,551 | B2* | 8/2016 | Kavaler ................ G01S 13/931 |
| 9,721,471 | B2 | 8/2017 | Chen et al. |
| 10,002,537 | B2 | 6/2018 | Chen et al. |
| 10,304,335 | B2* | 5/2019 | Jain ....................... G01S 13/931 |
| 2003/0160717 | A1* | 8/2003 | Mattes ................. G01S 13/931 |
| | | | 342/70 |
| 2015/0219760 | A1 | 6/2015 | Hiramaki et al. |
| 2016/0171893 | A1 | 6/2016 | Chen et al. |
| 2017/0287337 | A1 | 10/2017 | Chen et al. |

OTHER PUBLICATIONS

A. Loeffler et al., "Parking Lot Measurement with 24 GHz Short Range Automotive Radar"; published in Proceedings of the 2015 16th International Radar Symposium; published by IEEE, Piscataway, NJ, USA, on Aug. 27, 2015. (Year: 2015).*

J. K. Suhr et al, "Sensor Fusion-Based Vacant Parking Slot Detection and Tracking"; IEEE Transactions on Intelligent Transportation Systems; vol. 15, No. 1; Feb. 2014; pp. 21-36; published by IEEE, Piscataway, NJ, USA. (Year: 2014).*

J. K. Suhr et al, "Automatic Parking Space Detection and Tracking for Underground and Indoor Environments"; IEEE Transactions on Industrial Electronics; vol. 63, issue 9; Apr. 26, 2016; pp. 5687-5698; published by IEEE, Piscataway, NJ, USA. (Year: 2016).*

R. Dube et al, "Detection of Parked Vehicles from a Radar Based Occupancy Grid"; published in Proceedings of the 2014 IEEE Intelligent Vehicles Symposium (IV); published by IEEE, Piscataway, NJ, USA. (Year: 2014).*

International Search Report of PCT/EP2018/079152 dated Jan. 3, 2019.

Teeravech, K., et al., "Discovering repetitive patterns in facade images using a RANSAC-style algorithm", ISPRS Journal of Photogrammetry and Remote Sensing, vol. 92, Mar. 31, 2014 (Mar. 31, 2014), pp. 38-53, XP002781155, ISSN: 0924-2716, DOI: 10.1016/j.isprsjprs.2014.02.018.

Friedman, Sam, et al., "Online facade reconstruction from dominant frequencies in structured point clouds", Computer Vision and Pattern Recognition Workshops (CVPRW), 2012 IEEE Computer Society Conference On, IEEE, Jun. 16, 2012 (Jun. 16, 2012), pp. 1-8, XP032206771, DOI: 10.1109/CVPRW.2012.6238908; ISBN: 978-1-4673-1611-8.

* cited by examiner

DETECTION OF PARKING SLOT CONFIGURATION BASED ON REPETITIVE PATTERNS

CROSS-REFERENCE TO RELATED APPLICATIONS

This application is a 35 U.S.C. § 371 national phase of PCT International Application No. PCT/EP2018/079152, filed Oct. 24, 2018, which claims the benefit of priority under 35 U.S.C. § 119 to European Patent Application No. 17201076.1, filed Nov. 10, 2017, the contents of which are incorporated herein by reference in their entirety.

FIELD OF THE INVENTION

The present disclosure relates to sensor systems and signal processing devices suitable for automated vehicle systems such as autonomous driving and driver assistance. Methods and devices for locating and characterizing parking slot configurations, such as a row of parking slots, by use of radar detections are disclosed.

BACKGROUND

Today, vehicle environment sensor systems, such as camera systems, radio detection and ranging (radar) systems and light detection and ranging (lidar) systems, can be mounted on a vehicle, often referred to as an ego vehicle, to detect and to track objects in a vicinity of the vehicle. The input from these sensor systems can be used to automate vehicle systems such as speed control and collision prevention. Auto alignment, ego motion estimation, scene understanding, lane keeping assist (LKA) and automated driving (AD) are also enabled by using the sensor system output signals.

Radar systems are sensor systems arranged to produce output including a series of reflection points as measured by radar receiver sensors. Reflection points can be treated as separate detections or grouped if they relate to the same object. Reflection points or groups of reflection points observed over time can be used to track the motion of an object over time. Such a determination over time is referred to as the track of an object.

Radar-based sensor systems may be used to locate objects such as parked cars. A row of parked cars is indicative of a parking facility. Therefore, radar-based sensor systems may be used to locate parking slots and rows of parking slots. Such parking slot detection systems need to be robust and provide reliable output.

The article "Discovering repetitive patterns in facade images using a RANSAC-style algorithm", K. Teeravech, M. Nagai, K. Honda, and M. Dailey, ISPRS Journal of Photogrammetry and Remote Sensing, Elsevier, 31 Mar. 2014, discusses finding repetitive patterns in sensor data.

There is a need for enhanced methods to detect configuration of parking slots, such as a row configuration, by use of sensor data.

It is an object of the present disclosure to provide improved methods and devices for locating and characterizing a configuration of parking slots by use of radar detections.

SUMMARY

The above expressed object is achieved by a method performed by a sensor signal processing unit for detecting a configuration of parking slots based on radar detections. The method includes receiving a plurality of radar detections from a radar-based sensor system, generating a representation of a spatial distribution of a set of coordinates associated with the radar detections, and detecting the configuration of parking slots based on a Fourier transform of the representation of spatial distribution.

The object is also achieved by a sensor signal processing unit arranged to detect a configuration of parking slots based on radar detections received from a radar-based sensor system. The sensor signal processing unit includes a histogram unit arranged to generate a representation of a spatial distribution of a set of coordinates associated with the radar detections, and a detection unit arranged to detect the configuration of parking slots. The detection unit is arranged to detect the configuration of parking slots based on a Fourier transform of the representation of spatial distribution.

Advantageously, the presence of a parking facility may be detected.

Advantageously, parking slot configurations, such as parking rows can be detected with increased accuracy.

Advantageously, a parking slot may also be located more exactly.

Advantageously, parking slot configuration detection is made more robust by application of the proposed techniques.

Further advantages are described herein.

BRIEF DESCRIPTION OF THE DRAWINGS

The present disclosure will now be described more in detail with reference to the appended drawings, where.

DETAILED DESCRIPTION

The inventive concepts will now be described more fully hereinafter with reference to the accompanying drawings, in which certain embodiments of the inventive concepts are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concepts to those skilled in the art. Like numbers refer to like elements throughout the description. Any step or feature illustrated by dashed lines should be regarded as optional.

Figure 1:
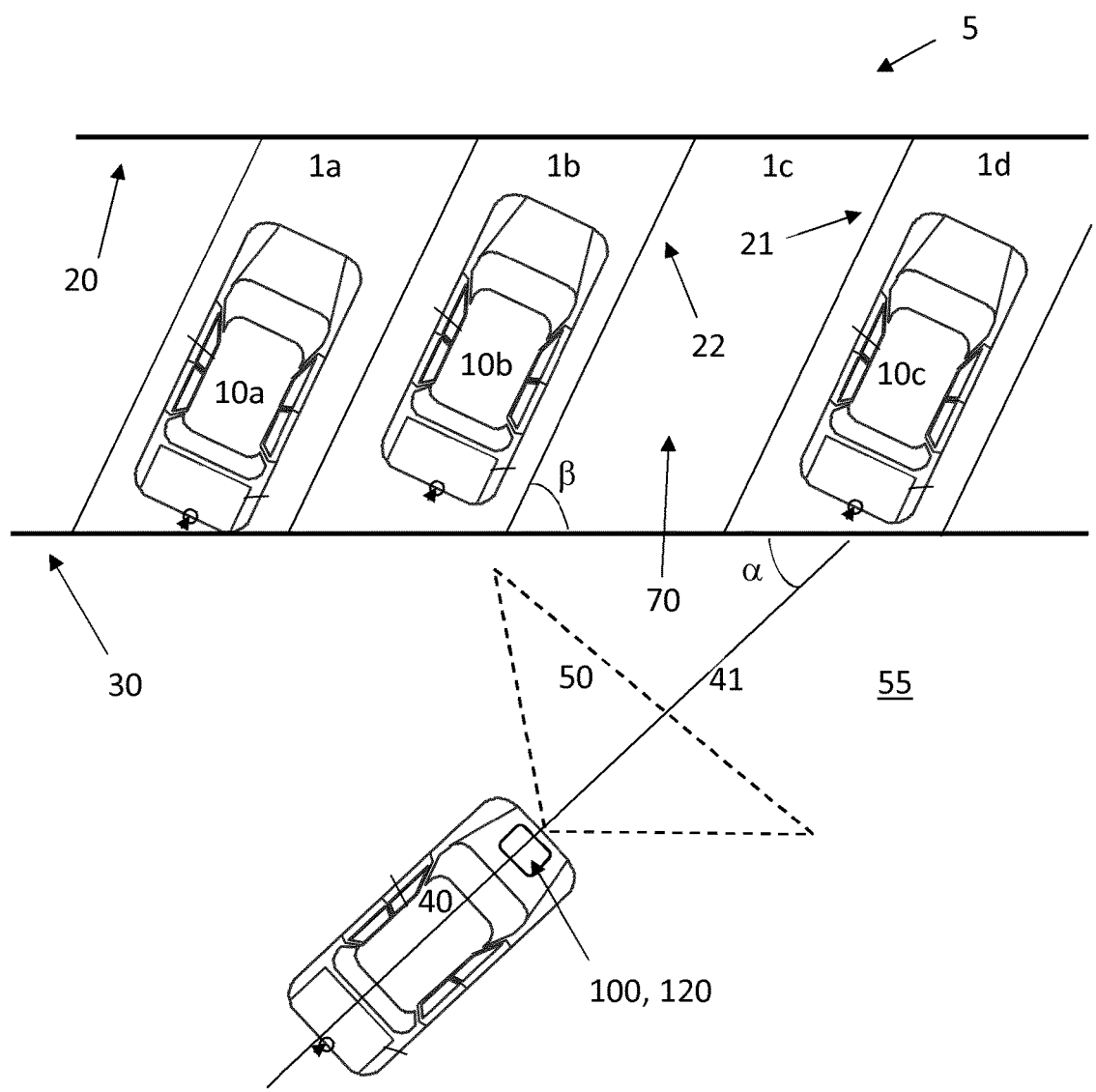
FIG. 1 schematically illustrates a parking facility.

FIG. 1 schematically illustrates a row of parking slots 5. Vehicles 10a, 10b, 10c are parked in slots 1a, 1b, 1d. The parking slots are arranged in a row of parking slots delimited by boundaries 20, 30. The row of parking slots shown in FIG. 1 has a slant angle β, which is an angle at which parking slots are tilted relative to the boundary lines 20, 30 of the row of parking slots. Individual parking slots are delimited by parking slot boundaries 21, 22.

The parking slot configuration is here a row of parking slots, but other configurations are also possible. In general, a parking facility is a place where cars may be parked according to a given pre-determined configuration. Parking slot configurations differ between parking facilities. Examples of parking slot configurations include rows, slanted rows, straight lines where cars are parked side-by-side, straight lines where cars are parked front-to-back, or different rectangular configurations. Herein, a configuration of parking slots is to be interpreted broadly to encompass any type of configuration of parking slots. A common denominator of most parking facilities is a repetitive pattern in the parking slot layout.

FIG. 1 also shows an ego vehicle 40 which is performing a detection of the configuration of parking slots. The parking slot configuration illustrated in FIG. 1 is located at an angle α relative to the ego vehicle 40, measured, e.g., from a center line 41 of the ego vehicle to a boundary line 30 of the parking row.

The ego vehicle 40 includes a sensor signal processing unit 100 and a radar-based sensor system 120. The radar-based sensor system illuminates an environment 55 in a vicinity of the ego vehicle by radar signals 50 in a field of view. Objects, such as the parked vehicles 10a, 10b, 10c, but also, e.g., curbs, signs, buildings, and road boundaries in the environment 55 give rise to radar signal reflections, which reflections are received by the radar-based sensor system 120. These reflections are processed to generate radar detections. The received signal quality of radar detections often decreases with range.

A radar detection corresponds to a reflected signal component, reflected from a location in the environment. Each radar detection is associated with coordinates in two or three dimensions. Radar detection coordinates may be given in relative terms or in absolute terms. Relative coordinates are often specified in relation to the radar-based sensor system, such as a bearing and a range. Relative angle with respect to the radar-based sensor system may also be given in three dimensions, i.e., in terms of bearing and attitude, or vertical and horizontal bearing. Absolute coordinates are often specified in an absolute coordinate system such, e.g., a cartesian coordinate system, the Universal Transverse Mercator (UTM) system, or the Universal Polar Stereographic (UPS) coordinate systems.

An object of the ego vehicle is to determine a configuration of the parking facility, to facilitate, e.g., a parking operation of the ego vehicle or to assist a driver in finding a suitable parking location for the ego vehicle. A determination of configuration, according to aspects, includes determining if a set of radar detections corresponds to a parking facility, or if the radar detections were generated by objects not associated with a parking facility.

As mentioned above, a special feature of parking rows is the periodical distance of parked cars which is caused by a repetitive pattern of painted lines at the ground, delimiting parking slots. This feature of a repetitive pattern can be used to locate a parking facility and to locate a free parking slot more robustly. This feature of a repetitive pattern can also be used to determine if a parking facility is actually included in the environment 55, or if no parking facility exists.

A determination of configuration may optionally also include a determination of parking row angle α with respect to the sensor system, parking slot slant angle β, parking slot width, location of boundary lines 20,21,22,30, location of occupied parking slots, and location of available parking slots, such as parking slot 70 illustrated in FIG. 1.

A determination of configuration of a parking facility is preferably robust in the sense that erroneous determinations do not occur, or only occur rarely. An erroneous determination may, e.g., correspond to a determination of incorrect configuration, such as incorrect parking row angle, incorrect slant angle, incorrect parking slot width, incorrect location of boundary lines 20, 30, incorrect location of occupied parking slots, and incorrect location of available parking slots.

Figure 2:
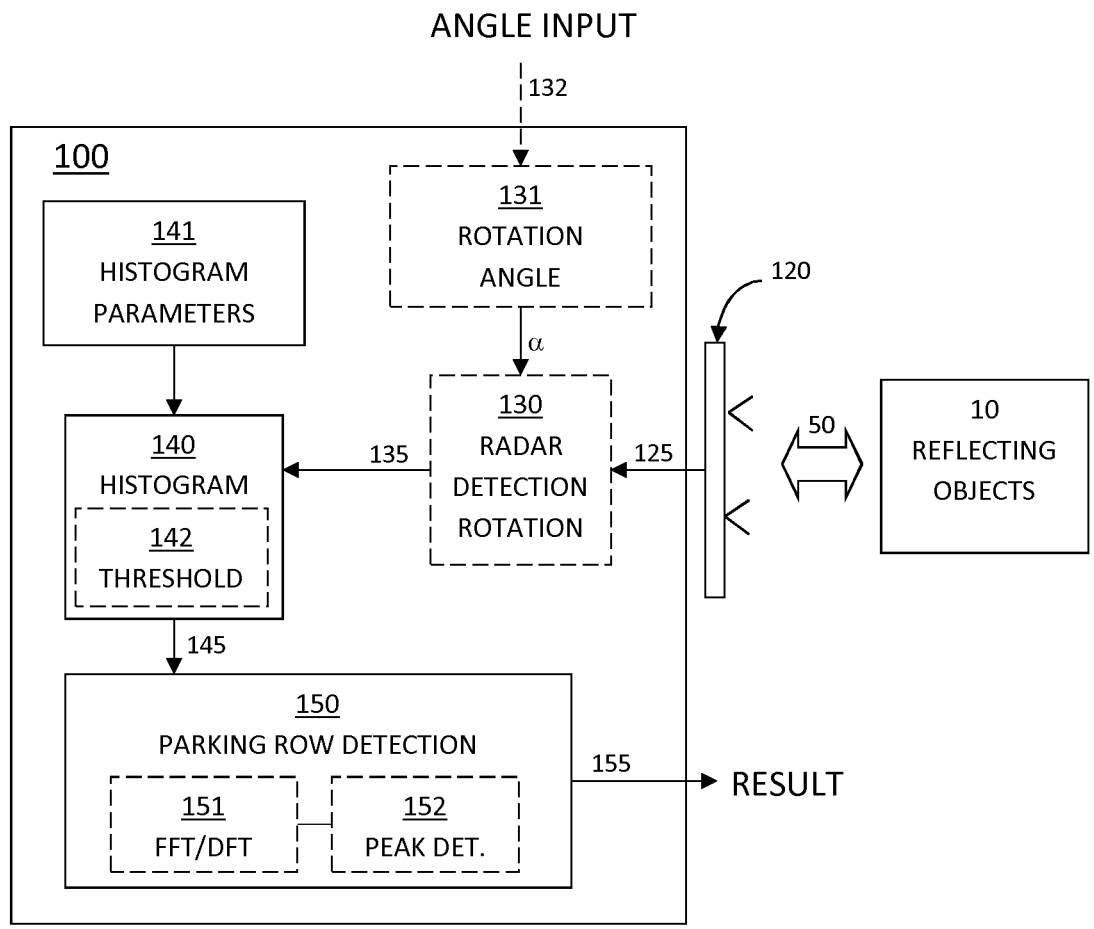
FIG. 2 is a block diagram schematically illustrating a radar-based sensor system.

FIG. 2 is a block diagram schematically illustrating a radar-based sensor system 120 and a sensor signal processing unit 100. The radar-based sensor system 120 is arranged to transmit radar signals 50 and to receive and detect reflections from reflecting objects 10 in the environment. The radar detections 125 are received by the sensor signal processing unit 100 via an interface. The sensor signal processing unit 100 is arranged to detect a configuration of parking slots 1a, 1b, 1c, 1d based on the radar detections 125 received from the radar-based sensor system 120. The sensor signal processing unit, according to aspects, includes a radar detection rotation unit 130 arranged to rotate coordinates of the radar detections 125 based on a rotation angle α to generate a set of rotated coordinates 135. The rotation angle α corresponds to an angle of the configuration of parking slots relative to a center line of the ego vehicle, or relative to an orientation of the radar sensor, as illustrated in FIG. 1.

The rotation angle by which detections are rotated is, according to some aspects, obtained from a memory, i.e., a storage medium 730, of the sensor signal processing unit 700, or is obtained as an angle input signal 132 to the sensor signal processing unit 100. Rotation angle and the obtaining of rotation angle, will be discussed in more detail below.

A histogram unit 140 is arranged to generate a representation 145 of a spatial distribution of the set of coordinates, or of the set of rotated coordinates in case coordinates have been rotated to account for, e.g., parking row angle or parking slot slant angle prior to generating the representation of spatial distribution.

It is appreciated that a representation of spatial distribution of radar detections includes data which describes how radar detections are distributed spatially. For instance, a representation of spatial distribution can indicate if radar detections are clustered in some particular fashion, or if there is a high density of radar detections along a line in the environment. An example of a representation of spatial distribution is a histogram of coordinates, which histogram indicates if there is a high density of radar detections at some specific location or area, and if there is a low density of radar detections at some other specific location or area.

In other words, according to some aspects, the representation of spatial distribution indicates clustering of radar detections separated by straight lines in a coordinate system, which lines are indicative of parking row boundaries 20,30.

The above-mentioned spatial distribution will be discussed in more detail below in connection to FIG. 5 and FIG. 6.

The sensor signal processing unit further includes a detection unit 150 arranged to detect the configuration of parking slots based on a Fourier transform of the representation of spatial distribution. A rationale behind the disclosed method of detecting a configuration of parking slots, such as a parking row configuration, based on a Fourier transform of the representation of spatial distribution, is that a representation of spatial distribution often presents repetitive patterns in case of parked vehicles. Vehicles are often parked according to repetitive patterns, e.g., in a row or slanted row. A Fourier transform will indicate such repetitive pattern in the spatial distribution by an amplitude corresponding to the repetition frequency, which indication can be exploited in detecting a configuration of parking slots based on the radar detections.

To detect the presence of a parking facility, such as a row of parking slots, a frequency of the Fourier transform may correspond to repetition patterns of between approximately 2 meters and up to approximately 8 meters. This range of distances correspond to common parking distances of small vertically orientated cars up to longer vehicles parked in parallel. If there are one or more strong repetition frequencies in this range, the probability that radar detections correspond to a parking facility is high compared to when there is no such repetition frequency in the Fourier transform output. Also, an amplitude of the repetition frequency is indicative of the presence of a parking facility, a weak amplitude repetition frequency being less indicative of a parking facility than a strong amplitude repetition frequency.

According to some aspects which will be further discussed below, the detecting is performed based on a Fast Fourier Transform implementation or a Discrete Fourier Transform implementation. The Fast Fourier Transform and Discrete Fourier Transform both indicate repetitive pattern in the respective transformed output, and can thus be used for detecting presence of a parking facility, according to the discussion above. To perform these operations the sensor signal processing unit 100 includes a Discrete Fourier Transform (DFT) 151 or a Fast Fourier Transform (FFT) module 151.

According to some aspects, the sensor signal processing unit 100 is arranged to detect the configuration of parking slots based on peak detection of the FFT or DFT output.

Peak detection refers to the detection of peaks, or areas with amplitude significantly above average, in a data set.

The sensor signal processing unit 100 further includes an output port arranged to output a result of performed operations 155, which result may comprise an estimate of the configuration of parking slots.

Figure 3:
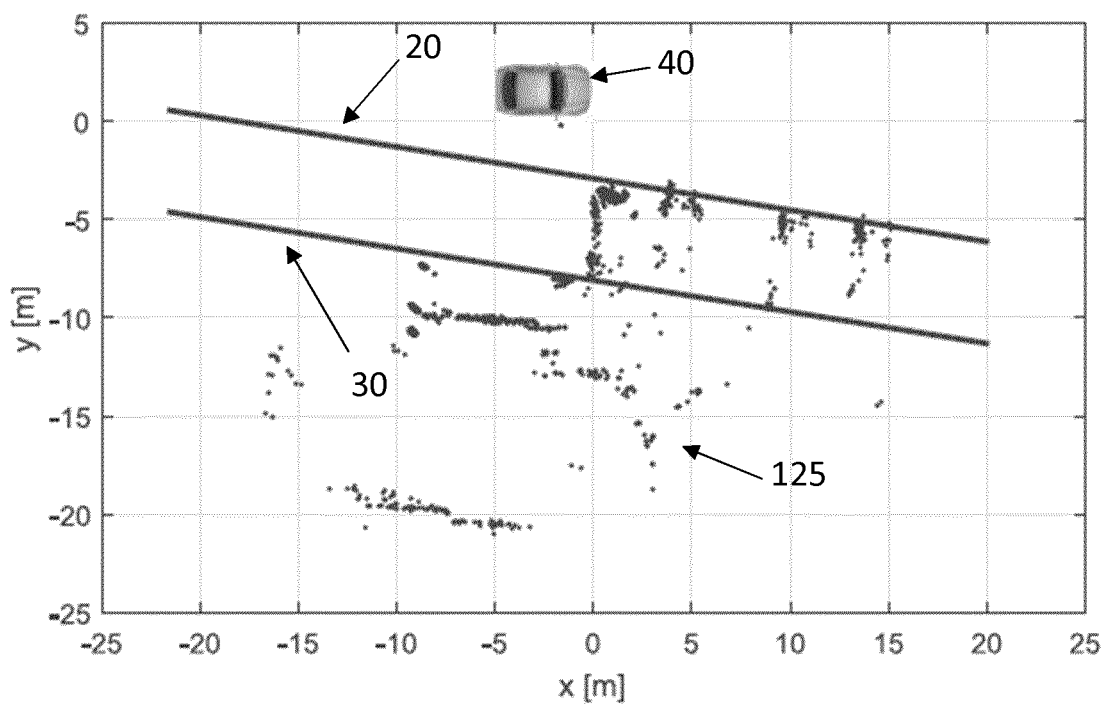
FIG. 3 illustrates radar detections associated with a row of parking slots.

FIG. 3 illustrates the above-mentioned radar detections 125 associated with a row of parking slots. An ego vehicle 40 has received a set of radar detections 125, and has located boundaries of a parking row 20,30. There exists a plurality of known approaches to locate boundary lines in a set of radar detections, for instance, a Random Sample Consensus (RANSAC) algorithm may be applied to determine subsets of radar detections corresponding to straight lines in the ego vehicle environment. The ego vehicle may now attempt to characterize the parking facility, which may comprise determining if the discovered boundary lines correspond to a parking facility.

Figure 4:
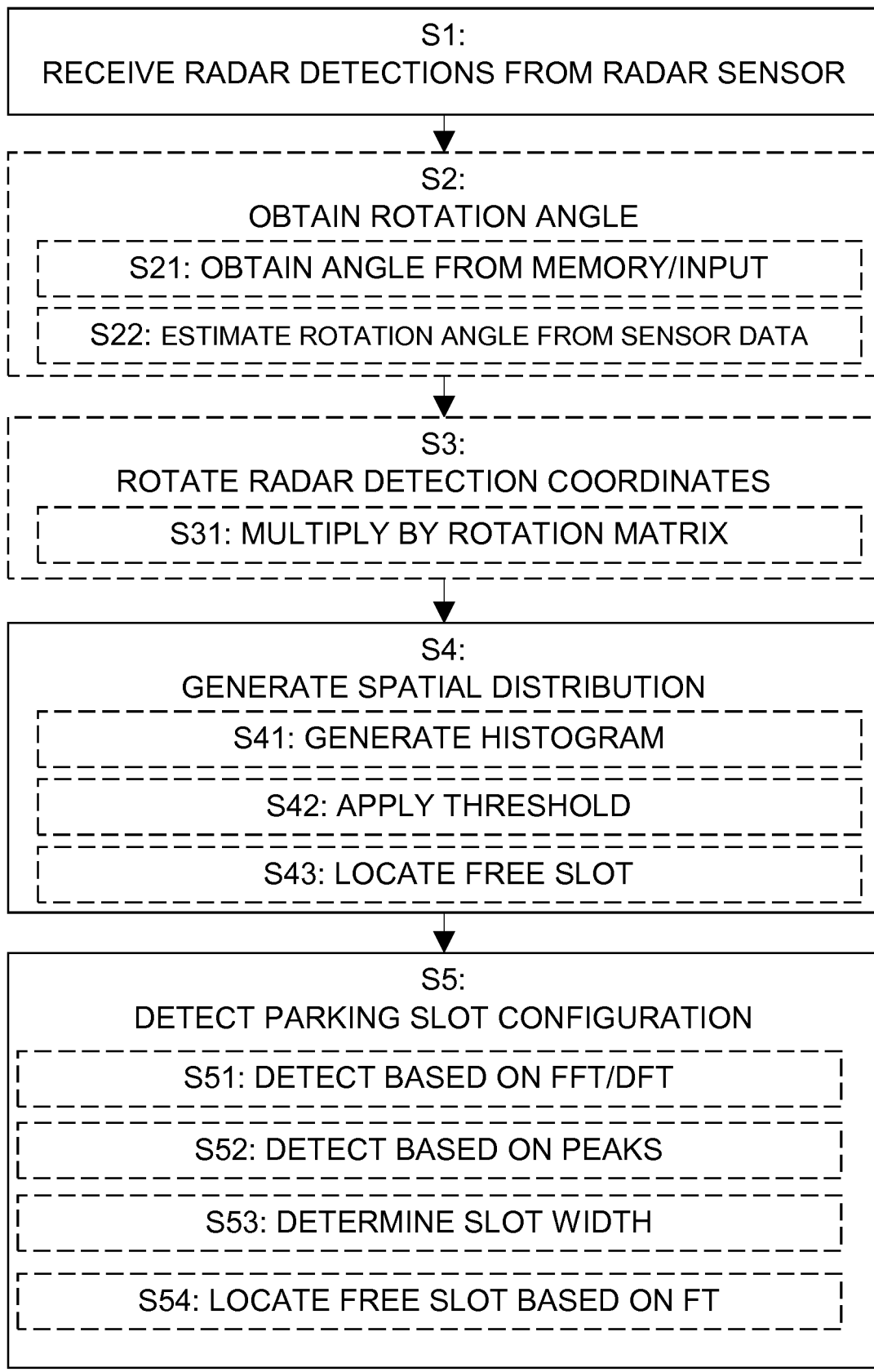
FIG. 4 is a flowchart illustrating methods according to the present disclosure.

FIG. 4 is a flowchart illustrating methods according to the present disclosure. The disclosed methods may, e.g., be performed by the sensor signal processing unit 100 discussed in connection to FIG. 2, or by the control unit 700 discussed in connection to FIG. 7 below.

FIG. 4 illustrates a method performed by a sensor signal processing unit 100 for detecting a configuration of parking slots 1*a*, 1*b*, 1*c*, 1*d* based on radar detections 125. The method includes receiving S1 a plurality of radar detections 125 from a radar-based sensor system 120, generating S4 a representation of a spatial distribution of the set of coordinates, and detecting S5 the configuration of parking slots based on a Fourier transform of the representation of spatial distribution.

It is appreciated that said determining may be based on radar detections corresponding to forefronts of parked vehicles. Consequently, according to aspects, the radar detections correspond to radar reflections by forefronts of parked vehicles associated with the configuration of parking slots.

According to an example, the detecting S5 includes analyzing a main frequency of the Fourier transformed representation of spatial distribution and comparing to a distance range of approximately 2 to 8 m. This distance range includes common parking distances of small vertically orientated cars up to long parallelly orientated parked vehicles. If there is one strong repetition frequency having multiples without side frequencies the probability for a parking row is high. Thus, the amplitude of a main or strong frequency component in the Fourier transformed representation of spatial distribution and the fact that there are no other repetition frequencies is an indicator for the probability that radar detections correspond to a parking facility, such as a parking row.

According to some aspects, the method also includes obtaining S2 a rotation angle $\alpha$ corresponding to an angle of a row of parking slots relative to the radar sensor, and rotating S3 coordinates of the radar detections based on the rotation angle $\alpha$ to generate a set of rotated coordinates.

The rotation angle $\alpha$ corresponds to the angle between the ego car and the parking row, as shown in FIG. 1.

According to aspects, the obtaining S2 includes obtaining the rotation angle from memory, or from input data to the sensor signal processing unit. According to some such aspects, it is assumed that a rotation angle can be determined by systems external to the sensor signal processing unit 100. Such systems may, e.g., be based on camera sensors, or on radar sensors, or on some other type of sensor known in the art. Rotation angles can also be known from, e.g., map data or other external sources.

According to some further aspects, the method includes obtaining a parking row angle corresponding to a parking facility in a vicinity of the ego vehicle from a database indexed by geographic location.

According to some aspects, the rotating S3 includes multiplying coordinates of the radar detections by a rotation matrix generated based on the rotation angle $\alpha$. This rotation matrix is, according to some aspects, given by $$\begin{bmatrix} \cos\alpha & -\sin\alpha \\ \sin\alpha & \cos\alpha \end{bmatrix}$$

Figure 5:
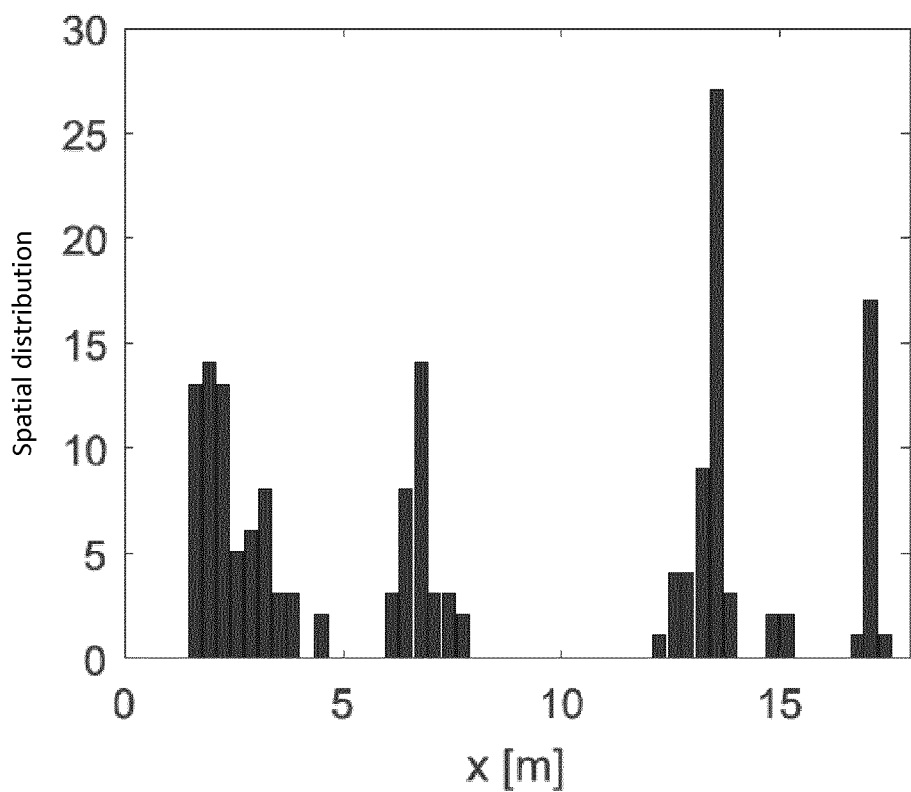
FIG. 5 shows a graph illustrating a spatial distribution of coordinates.

According to some aspects, as discussed above, the representation of a spatial distribution of the set of rotated coordinates includes a histogram of rotated coordinates, such as the histogram illustrated in FIG. 5.

A histogram, in general, may be determined as $$P_{FFT}(j) = \sum_{k=1}^{K} \begin{cases} 1 & \text{if } (j-1)W \leq d_k(x) \leq jW \\ 0 & \text{else} \end{cases}, j = 1, 2, \ldots, J$$

where j is a histogram bin out of J histogram bins, k indexes radar detections, K is the number of received radar detections, W is a bin width parameter, and $d_k(x)$ is a coordinate of a rotated detection from the set of rotated coordinates.

Figure 6A:
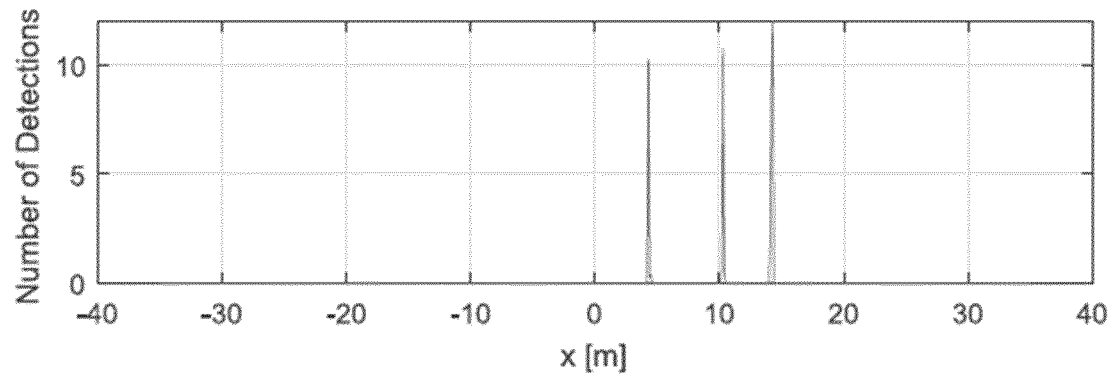
FIG. 6A shows a graph illustrating examples of radar signal processing.

FIG. 6A illustrates an example representation of a spatial distribution as discussed above. Here we note that there are high densities of radar detection coordinates around approximately 5 meters, around 10 meters, and around 15 meters.

According to aspects, with reference to FIG. 1, the obtaining S2 optionally includes obtaining a second rotation angle β. This second rotation angle corresponds to a slant angle of parking slots in a row of parking slots, as shown in FIG. 1. The second angle β can be determined as the rotation angle that minimizes an entropy measure of the set of rotated coordinates. To elaborate on this example of obtaining the second rotation angle, consider a case with K radar detections. The K radar detections d(k), k=1 . . . , K, such as the radar detections shown in FIG. 3, are first rotated by use of a rotation matrix to generate a set of rotated detections $d_{k2}$.

$$d_{k2}(\beta) = \begin{bmatrix} \cos\beta & -\sin\beta \\ \sin\beta & \cos\beta \end{bmatrix} d_{k_{rx}}, 1 \leq k2 \leq K$$

where $d_{k\_rx}$, is the kith radar detection prior to rotation by angle β.

Rotated radar detection coordinates are then sorted and counted to generate a histogram. FIG. 5 shows a graph illustrating an example of such a histogram. The histogram shows occurrences of coordinates in different ranges, or bins. In FIG. 5. it is noted that rotated radar detections have coordinates, e.g., x-coordinates clustered around approximate values of 2-3 meters, around 6-7 meters, and around 12-13 meters.

For each rotation angle α, an entropy value is determined, e.g., according to $$H_{row}(\beta) = \sum_{j=1}^{B} P_{row}(j, \beta)\log_2(P_{row}(j, \beta))$$

Where $H_{row}(\beta)$ is an entropy value evaluated for a rotation angle of β, B corresponds to the number of bins in the histogram, $P_{row}(j, \beta)$ is the histogram value for bin j determined for rotation angle β. An estimate of slant angle of a row of parking slots, is given by the rotation angle which minimizes the entropy value.

According to an example, radar detections may be rotated to compensate for angles α and β prior to the generating of the representation of spatial distribution.

In some scenarios, the radar detections comprise clutter, i.e., detections that do not correspond to physical objects. In some other scenarios the radar detections may be affected by noise. In such cases it can be advantageous to apply a threshold to the generated representation of spatial distribution, such as the histograms discussed above. Consequently, according to some aspects, the histogram value for a bin is set to zero if the histogram value is below a threshold value. Also, since the reflection energy from an object is weaker for higher distances, the threshold value is, according to some aspects, a function of a distance from a position of the detection to a position of the radar-based sensor system 120. Due to such effects, reflections and/or detections at larger distances are in general expected to be originated from true physical objects and not from noise or clutter.

By looking at the representation of spatial distribution, it is possible to infer locations of free parking slots in a row of parking slots. For example, by investigating a histogram such as the histogram illustrated in FIG. 5, it can be inferred that a free parking slot is located at around 10 meters, where there is no high density of coordinates. From looking at FIG. 6A, it can be inferred that parking slots corresponding to detections at 5, 10, and 15 meters are occupied.

Consequently, according to some aspects, the generating S4 includes locating S43 a free parking slot included in the configuration of parking slots based on the representation of spatial distribution and/or the histogram of rotated coordinates.

The detecting of parking slot configuration may comprise evaluating a probability that radar detections correspond to a parking facility, and are not generated from objects not associated with a parking facility, such evaluating may, as discussed above, be performed by analyzing peaks of the Fourier transformed spatial distribution.

According to some aspects, the detecting S5 includes determining S51 a Discrete Fourier Transform DFT or a Fast Fourier Transform FFT of the representation of spatial distribution.

Figure 6B:
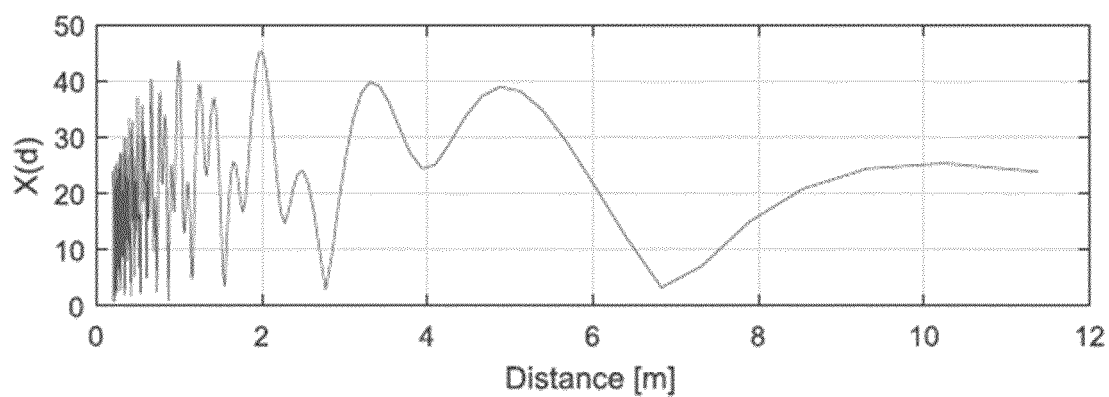
FIG. 6B shows a graph illustrating examples of radar signal processing.

FIG. 6B shows a graph illustrating examples of radar signal processing. More specifically, FIG. 6B illustrates the result of applying a Fourier transform to the representation of spatial distribution shown in FIG. 6A. By investigating the output of the Fourier transform, or inverted Fourier transform, a characterization of a parking facility may be performed, e.g., by peak detection. For instance, repetition frequencies corresponding to repetitive pattern having distinct repetition distances become visible in the type of data shown in FIG. 6B.

According to some aspects, the detecting S5 includes locating S52 one or more peaks in the Fourier transform corresponding to the slot boundaries, i.e. the distances between the individual slots within the row. Thus, repetitive patterns are detected by use of peak detection in the Fourier transform results.

According to some other aspects, the detecting S5 includes characterizing S53 a width of a parking slot included in the configuration of parking slots based on the Fourier transform of the representation of spatial distribution. Or, in other words, characterization of parking slot width can be determined based on a repetition distance inferred from the Fourier transform result.

According to some further aspects, the detecting S5 includes locating S54 a free parking slot included in the configuration of parking slots based on the Fourier transform of the representation of spatial distribution. A free parking slot gives rise to additional frequency components in the Fourier transform result, since a free parking slot brakes the repetitive pattern of a row of parked cars with no free parking slots.

Figure 7:
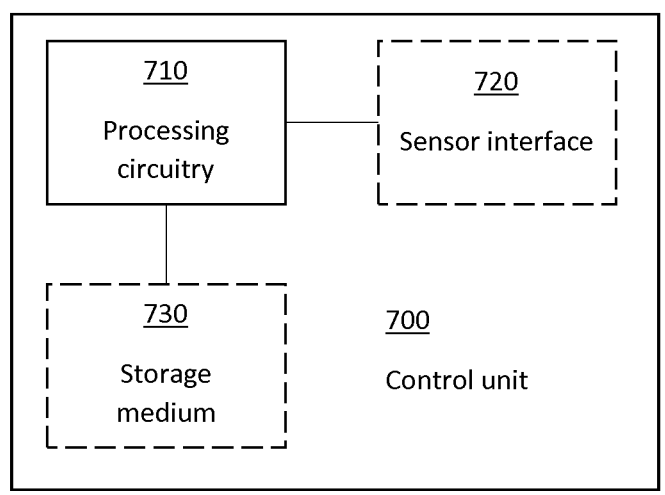
FIG. 7 schematically illustrates components of a control unit.

FIG. 7 schematically illustrates components of a control unit 700. Some of the various example embodiments described herein, in particular related to the sensor signal processing units and control units, are described in the general context of functional units, method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs, DVDs, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

According to some aspects, the disclosed sensor signal processing units and control units comprise processing circuitry. The processing circuitry may be any suitable type of computation unit, e.g. a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry.

FIG. 7 schematically illustrates, in terms of a number of functional units, the components of a control unit 700 according to an embodiment. Processing circuitry 710 is provided using any combination of one or more of a suitable central processing unit (CPU), multiprocessor, microcontroller, digital signal processor (DSP), etc., capable of executing software instructions stored in a computer program product, e.g. in the form of a storage medium 730. The processing circuitry 710 may further be provided as at least one application specific integrated circuit (ASIC), or field programmable gate array (FPGA).

Particularly, the processing circuitry 710 is configured to cause the control unit 700 to perform a set of operations, or steps. These operations, or steps, was discussed above in connection to FIG. 3 For example, the storage medium 730 may store the set of operations, and the processing circuitry 710 may be configured to retrieve the set of operations from the storage medium 730 to cause the control node 700 to perform the set of operations. The set of operations may be provided as a set of executable instructions. Thus, the processing circuitry 710 is thereby arranged to execute methods as herein disclosed.

The storage medium 730 may also comprise persistent storage, which, for example, can be any single one or combination of magnetic memory, optical memory, solid state memory or even remotely mounted memory.

The control unit 700 may further comprise a communications interface 720 for communications with at least one sensor device, i.e., a sensor interface 720. As such, the sensor interface 720 may comprise one or more transmitters and receivers, including analogue and digital components and a suitable number ports for wireline or wireless communication.

The processing circuitry 710 is adapted to control the general operation of the control node 700 e.g. by sending data and control signals to the sensor interface 720 and the storage medium 730, by receiving data and reports from the sensor interface 720, and by retrieving data and instructions from the storage medium 730. Other components, as well as the related functionality, of the control node 700 are omitted in order not to obscure the concepts presented herein.

In summary, there is disclosed herein a method performed by a sensor signal processing unit 100 for detecting a configuration of parking slots 1a,1b,1c,1d based on radar detections 125, the method includes receiving S1 a plurality of radar detections 125 from a radar-based sensor system 120, generating S4 a representation of a spatial distribution of a set of coordinates associated with the radar detections, and detecting S5 the configuration of parking slots based on a Fourier transform of the representation of spatial distribution.

According to aspects, the method includes obtaining S2 a rotation angle α corresponding to an angle between a sensor of the radar-based sensor system and the configuration of parking slots, and rotating S3 coordinates of the radar detections based on the rotation angle to generate a set of rotated coordinates prior to the generating S4.

According to aspects, the obtaining S2 c includes obtaining S21 the rotation angle from a memory, or from input data to the sensor signal processing unit.

According to aspects, the obtaining S2 includes estimating S22 the rotation angle from data generated by a sensor device arranged to detect the angle between the sensor of the radar-based sensor system and the configuration of parking slots.

According to aspects, the rotating S3 includes multiplying S31 coordinates of the radar detections by a rotation matrix generated based on the rotation angle α.

According to aspects, the representation of a spatial distribution of the set of coordinates includes a histogram S41 of the coordinates.

According to aspects, the histogram is given by $$P_{FFT}(j) = \sum_{k=1}^{K} \begin{cases} 1 & \text{if } (j-1)W \le d_k(x) \le jW \\ 0 & \text{else} \end{cases}, j = 1, 2, \ldots, J$$

where j is a histogram bin out of J histogram bins, k indexes radar detections, K is the number of received radar detections, W is a bin width parameter, and $d_k(x)$ is a coordinate associated with the plurality of radar detections.

According to aspects, the radar detections correspond to radar reflections by forefronts of parked vehicles associated with the configuration of parking slots.

According to aspects, the histogram value for a bin is set to zero if the histogram value is below a threshold value S42, and the threshold value is a function of a distance from a position of the detection to a position of the radar-based sensor system 120.

According to aspects, the generating S4 includes locating S43 a free parking slot included in the configuration of parking slots based on the representation of spatial distribution and/or the histogram of rotated coordinates.

According to aspects, the detecting S5 includes determining S51 a Discrete Fourier Transform DFT or a Fast Fourier Transform FFT of the representation of spatial distribution.

According to aspects the detecting S5 includes locating S52 one or more peaks in the Fourier transform corresponding to one or more distances between individual parking slots.

According to aspects, the detecting S5 includes characterizing S53 a width of a parking slot included in the configuration of parking slots based on the Fourier transform of the representation of spatial distribution.

According to aspects, the detecting S5 includes locating S54 a free parking slot included in the configuration of parking slots based on the Fourier transform of the representation of spatial distribution.

There is also disclosed herein a sensor signal processing unit 100 arranged to detect a configuration of parking slots 1a,1b,1c,1d based on radar detections 125 received from a radar-based sensor system 120, including a histogram unit 140 arranged to generate a representation 145 of a spatial distribution of the set of coordinates, and a detection unit 150 arranged to detect the configuration of parking slots, characterized in that the detection unit 150 is arranged to detect the configuration of parking slots based on a Fourier transform of the representation of spatial distribution.

According to some aspects, the sensor signal processing unit includes a radar detection rotation unit 130 arranged to rotate coordinates of the radar detections 125 based on a rotation angle α to generate a set of rotated coordinates 135.

There is furthermore disclosed herein a vehicle 40 having a sensor signal processing unit 100 as discussed herein.

While the above description constitutes the preferred embodiment of the present invention, it will be appreciated that the invention is susceptible to modification, variation and change without departing from the proper scope and fair meaning of the accompanying claims.

The invention claimed is:

1. A method adapted to be performed by a sensor signal processor for detecting a configuration of parking slots based on radar detections, the method comprising the steps of;
   receiving a plurality of radar detections from a radar-based sensor system,
   generating a representation of a spatial distribution of a set of coordinates associated with the radar detections, and
   detecting the configuration of parking slots based on a Fourier transform of the representation of spatial distribution.

2. The method according to claim 1, further comprising obtaining a rotation angle (α) corresponding to an angle between a sensor of the radar-based sensor system and the configuration of parking slots, and rotating coordinates of the radar detections based on the rotation angle to generate a set of rotated coordinates prior to the generating.

3. The method according to claim 2, wherein the obtaining step comprises obtaining the rotation angle from a memory, or from input data to the sensor signal processor.

4. The method according to claim 2, wherein the obtaining step comprises estimating the rotation angle from data generated by a sensor device arranged to detect the angle between the sensor of the radar-based sensor system and the configuration of parking slots.

5. The method according to claim 2, wherein the rotating step comprises multiplying coordinates of the radar detections by a rotation matrix generated based on the rotation angle (α).

6. The method according to claim 1, wherein the representation of a spatial distribution of the set of coordinates comprises a histogram of the coordinates.

7. The method according to claim 6, wherein the histogram is given by $$P_{FFT}(j) = \sum_{k=1}^{K} \begin{matrix} 1 & \text{if } (j-1)W \le d_k(x) \le jW \\ 0 & \text{else} \end{matrix}, j = 1, 2, \ldots, J$$

where j is a histogram bin out of J histogram bins, k indexes radar detections, K is the number of received radar detections, W is a bin width parameter, and $d_k(x)$ is a coordinate associated with the plurality of radar detections.

8. The method according to claim 1, wherein the radar detections correspond to radar reflections by forefronts of parked vehicles associated with the configuration of parking slots.

9. The method according to claim 1, wherein the histogram value for a bin is set to zero if the histogram value is below a threshold value, and wherein the threshold value is a function of a distance from a position of the detection to a position of the radar-based sensor system.

10. The method according to claim 1, wherein the generating comprises locating a free parking slot comprised in the configuration of parking slots based on the representation of spatial distribution or the histogram of rotated coordinates.

11. The method according to claim 1, wherein the detecting step comprises determining a Discrete Fourier Transform (DFT) or a Fast Fourier Transform (FFT) of the representation of spatial distribution.

12. The method according to claim 1, wherein the detecting step comprises locating one or more peaks in the Fourier transform corresponding to one or more distances between individual parking slots.

13. The method according to claim 1, wherein the detecting step comprises characterizing a width of a parking slot comprised in the configuration of parking slots based on the Fourier transform of the representation of spatial distribution.

14. The method according to claim 1, wherein the detecting step comprises locating a free parking slot comprised in the configuration of parking slots based on the Fourier transform of the representation of spatial distribution.

15. A sensor signal processor arranged to detect a configuration of parking slots based on radar detections received from a radar-based sensor system, comprising a radar detection rotator arranged to rotate coordinates of the radar detections based on a rotation angle (α) to generate a set of rotated coordinates, a histogram generator arranged to generate a representation of a spatial distribution of the set of rotated coordinates, and a parking slot detector arranged to:
   determine a Fourier transform of the representation of the spatial distribution using one of a Discrete Fourier Transform or a Fast Fourier Transform; and
   locate one or more peaks in the Fourier transform of the representation of the spatial distribution corresponding to slot boundaries between the parking slots to detect the configuration of the parking slots.

* * * * *